(12) United States Patent
Vauchel et al.

(10) Patent No.: US 8,876,041 B2
(45) Date of Patent: Nov. 4, 2014

(54) LOCKING SYSTEM FOR AIR INTAKE STRUCTURE FOR TURBOJET ENGINE NACELLE

(75) Inventors: Guy Bernard Vauchel, Harfleur (FR); Jean-Philippe Dauguet, Tournefeuille (FR); Stephane Beilliard, Toulouse (FR)

(73) Assignee: Aircelle, Gonfreville L'Orcher (FR)

( * ) Notice: Subject to any disclaimer, the term of this patent is extended or adjusted under 35 U.S.C. 154(b) by 182 days.

(21) Appl. No.: 12/811,347

(22) PCT Filed: Nov. 28, 2008

(86) PCT No.: PCT/FR2008/001659
§ 371 (c)(1),
(2), (4) Date: Jun. 30, 2010

(87) PCT Pub. No.: WO2009/098402
PCT Pub. Date: Aug. 13, 2009

(65) Prior Publication Data
US 2010/0314501 A1    Dec. 16, 2010

(30) Foreign Application Priority Data
Jan. 18, 2008 (FR) ...................................... 08 00265

(51) Int. Cl.
| B64D 33/02 | (2006.01) |
| E05C 19/10 | (2006.01) |
| F02C 7/04 | (2006.01) |
| B64D 29/06 | (2006.01) |
| B64D 29/08 | (2006.01) |
| E05B 47/00 | (2006.01) |

(52) U.S. Cl.
CPC ......... *E05C 19/10* (2013.01); *E05B 2047/0086* (2013.01); *E05B 47/0012* (2013.01); *B64D 33/02* (2013.01); *F05D 2230/70* (2013.01); *B64D 2033/0206* (2013.01); *E05B 2047/0023* (2013.01); *B64D 2033/0286* (2013.01); *F02C 7/04* (2013.01); *B64D 29/06* (2013.01); *B64D 29/08* (2013.01)

USPC .......................................... 244/53 B; 60/798

(58) Field of Classification Search
CPC ......... B64D 33/02; B64D 29/06; B64D 29/00
USPC ..... 244/53 B, 53 R, 129.4; 60/796, 798, 799; 292/95, 121, 96, 99, 137, 163, 177, 292/144, 146
See application file for complete search history.

(56) References Cited

U.S. PATENT DOCUMENTS

| 2,800,346 | A | * | 7/1957 | Manning | ........................ 292/113 |
| 4,365,775 | A | * | 12/1982 | Glancy | ........................ 244/53 R |
| 4,613,099 | A | * | 9/1986 | Smith et al. | ................. 244/53 R |
| 6,340,135 | B1 | | 1/2002 | Barton | |

FOREIGN PATENT DOCUMENTS

| EP | 0890727 | 1/1999 |
| FR | 2757823 | 7/1998 |

(Continued)

OTHER PUBLICATIONS

International Search Report; PCT/FR2008/001659; Aug. 21, 2009.

*Primary Examiner* — Rob Swiatek
*Assistant Examiner* — Timothy Schwarz
(74) *Attorney, Agent, or Firm* — Brinks Gilson & Lione

(57) ABSTRACT

The invention relates to a nacelle for a turbojet engine that includes an air intake structure capable of directing an air flow towards a fan of the turbojet engine, and a middle structure for surrounding said fan and to which is attached the air intake structure in order to provide aerodynamic continuity, wherein the air intake structure includes at least one inner panel attached to the middle structure and defining, with the latter, a nacelle fixed structure and at least one outer longitudinal panel removably attached to the fixed structure and including an air intake lip in order to define a removable air intake structure, wherein the removable air intake structure is provided with a locking device including at least one electric lock capable of interaction with a complementary retention structure.

10 Claims, 4 Drawing Sheets

(56) References Cited

FOREIGN PATENT DOCUMENTS

| FR | 2906568 | 4/2008 |
| FR | 2913062 | 8/2008 |
| FR | 2916425 | 11/2008 |
| GB | 2274490 | 7/1994 |
| WO | 2006/033929 | 3/2006 |

* cited by examiner

LOCKING SYSTEM FOR AIR INTAKE STRUCTURE FOR TURBOJET ENGINE NACELLE

TECHNICAL FIELD

The present invention concerns a locking device for a translatable air intake structure equipping a turbojet engine nacelle.

BACKGROUND

An airplane is propelled by one or several propulsive assemblies comprising a turbojet engine housed in a tubular nacelle. Each propulsive assembly is attached to the airplane by a strut generally situated under a wing or at the fuselage.

A nacelle generally has a structure comprising an air inlet upstream from the engine, a middle section intended to surround a fan of the turbojet engine, and a downstream section designed to surround the combustion chamber of the turbojet engine and housing thrust reverse means.

The air inlet comprises, on one hand, an intake lip adapted to allow optimal collection toward the turbojet engine of the air necessary to supply the fan and the internal compressors of the turbojet engine, and on the other hand, a downstream structure on which the lip is attached and designed to suitably channel the air toward the blades of the fan, said downstream structure comprising an outer shroud and an inner acoustic panel. The assembly is attached upstream from a case of the fan belonging to the middle section of the nacelle.

The middle structure surrounds the fan and generally breaks down into an inner wall forming said fan case and an outer wall assuming the form of removable cowls mounted pivotably around a longitudinal axle forming a hinge in the upper portion (at 12:00) of the nacelle in order to allow access to the inside of the nacelle.

The assembly of these various elements (mobile cowls, case, air intake lip, outer shroud, acoustic panel) creates many aerodynamic breaks due to the presence of offsets and gaps between these elements inherent to their fastening together. Moreover, the mobile cowls are mounted on hinges, also generating aerodynamic disturbances.

One solution to improve the aerodynamic continuity of the outer surface of a nacelle was the object of French patent applications no. 06/08599 and no. 07/01256, not yet published.

This solution consists of integrating the air intake lip into the outer shroud, including all or part of the cowl there surrounding the fan case so as to form a single-piece structure. The whole of the wall thus formed is mounted mobile in translation.

The French patent application, not yet published, registered under number 07/03699 describes a manual locking system of said air intake structure and an associated manual system for helping the translation.

In a turbojet engine nacelle having such a translatable structure, the inner edge of the air intake lip comes, when said translatable structure is in closed position, into contact with a zone upstream from an inner wall of the air intake structure, inner wall generally realized in the form of an acoustic panel.

The translatable structure is guided and maintained on a fixed structure, comprising the inner wall of the air intake structure, by a plurality of rails.

The interface is made sealed by a joint system and is reinforced by a system of centering pins arranged on the periphery of the air intake lip/acoustic shroud junction and making it possible to improve its resistance to radial movements.

The maintenance of the mobile structure along longitudinal directions is done primarily by bolting the mobile structure on a fixed structure in a zone close to an installation interface of the acoustic shroud on the fan case.

Such a locking system therefore requires a large number of fixing means, the assembly and disassembly of which are long and tedious.

Also known is a manual locking system comprising a system for gripping the mobile structure by the handle at the end of maneuver of the structure. This technique makes it possible to avoid a long and tedious assembly/disassembly with a system of maintenance by bolting. However, such a system is not suited to motorized driving of the mobile structure since the manual drive system and the locking are coupled. One will also note that the adjustment of the gripping of the bolts is also long and tedious.

Because of these, there is a need for a locking system of such a mobile structure making it possible to resolve all or part of these problems.

BRIEF SUMMARY

The disclosure concerns a nacelle for a turbojet engine comprising an air intake structure capable of directing an air flow towards a fan of the turbojet engine and a middle structure for surrounding said fan and to which is attached the air intake structure in order to provide aerodynamic continuity, the air intake structure comprising, on one hand, at least one inner panel attached to the middle structure and defining, with the latter, a nacelle fixed structure and, on the other hand, at least one longitudinal outer panel removably attached to the fixed structure and including an air intake lip in order to define a removable air intake structure, characterized in that the removable air intake structure is provided with peripheral locking means including at least one electric lock each capable of interaction with a complementary retaining means.

Thus, by equipping the nacelle with electric peripheral locking means, the locking and unlocking of the air intake structure are easily controllable and can be remotely actuated using one or several centralized controls, for example, an airplane control and/or a nacelle control.

The implementation of electric locking means also makes it possible to avoid the placement of manual outer locking and unlocking means (handles, cables) generating aerodynamic accidents while also avoiding the use of bolt systems, the placement and unlocking of which are long and tedious.

Advantageously, the electric bolt comprises a hook capable of cooperating with a corresponding yoke.

Preferably, the removable air intake structure is equipped with a guide system of the rail/guideway type mounted on part of the fixed structure. Also preferably, the electric bolt(s) are each arranged essentially at the level of a guide rail. Thus, the locking means are preferably situated at the level of the stress zones and therefore allow better absorption of those stresses.

Advantageously, the electric bolts are associated with at least one means for detecting the locking and/or unlocking position.

Advantageously, the nacelle comprises a member for controlling the locking means.

According to one advantageous alternative embodiment, the control member is a handle, preferably retractable, capable of allowing the driving of the air intake structure in movement.

Advantageously, each electric locking means is capable of being locked and unlocked manually from the outside of the nacelle, for example via a hatch formed in the outer wall of the air intake structure.

Also advantageously, the electric locking means are capable of each receiving a mechanical inhibiting rivet designed to allow the blocking of the corresponding electric locking means.

Advantageously, the additional retaining means of each locking means can be adjusted in prestress.

According to a first alternative embodiment, the adjustment of the complementary retaining means is done using an adjusting screw capable of moving a lug having an inclined surface so as to allow adjustment of the complementary retaining means according to the direction of retention.

According to a second alternative embodiment, the adjustment of the complementary retaining means is done using a worm screw capable of cooperating with a threaded zone of said retaining means so as to allow translation of the retaining means along the retaining direction.

Advantageously, the complementary retaining means can be adjusted from outside the nacelle.

Preferably, the complementary retaining means are attached to the fixed structure while the electric bolts are attached to the removable structure.

BRIEF DESCRIPTION OF THE DRAWINGS

The implementation of the invention will be better understood using the detailed description provided below with respect to the appended drawing, in which.

DETAILED DESCRIPTION

Figure 1:
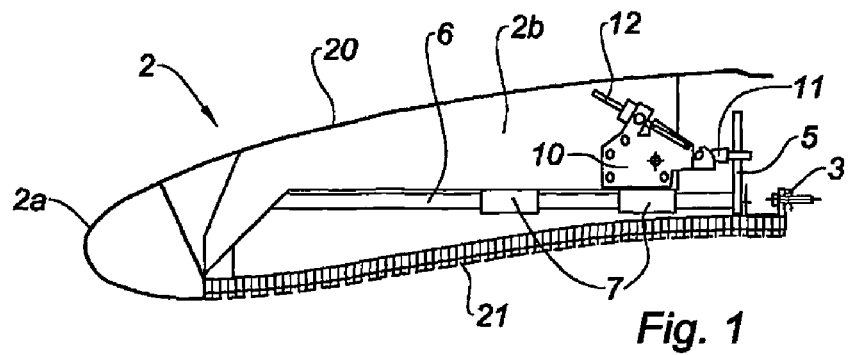
FIG. 1 is a partial diagrammatic illustration of an air intake structure of a nacelle according to the invention, the air intake structure being in the closed position.
Figure 2:
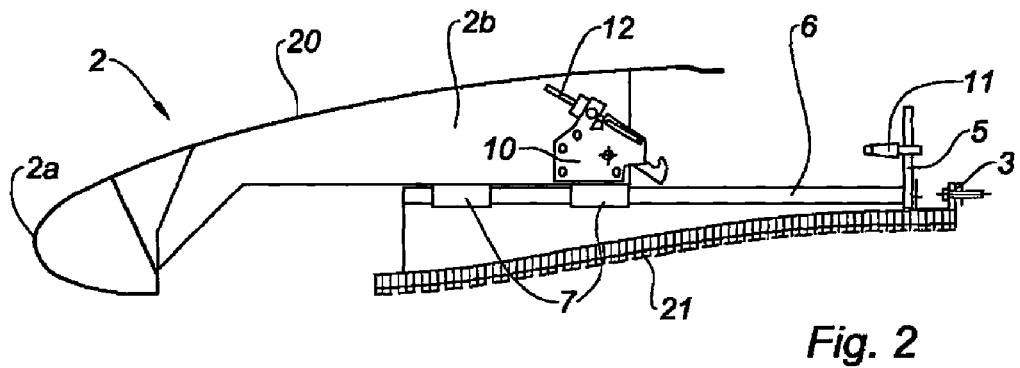
FIG. 2 is a partial diagrammatic illustration of the air intake structure of FIG. 1, the air intake structure being in the opening position.

A nacelle according to the invention as partially illustrated in FIGS. 1 and 2 constitutes a tubular housing for a turbojet engine (not shown) for which it serves to direct the air flows it generates by defining inner and outer aerodynamic lines necessary to obtain optimal performance. It also houses different components necessary to the operation of the turbojet engine as well as attached systems such as a thrust reverser.

The nacelle is designed to be attached to a fixed structure of an airplane, such as a wing, via a pylon.

More precisely, the nacelle has a structure comprising a front section forming an air inlet 2, a middle section (not visible) surrounding a fan (not visible) of the turbojet engine, and a rear section (not visible) surrounding the turbojet engine and able to house a thrust reverser system (not illustrated).

The air inlet 2 is divided into two zones, i.e. on one hand, an inlet lip 2a adapted to allow optimal collection toward the turbojet engine of the air necessary to supply the fan and inner compressors of the turbojet engine, and on the other hand, a downstream structure 2b comprising an outer panel 20 and an inner panel 21, generally acoustic.

According to the nacelle of the prior art, to which the present invention is applicable, the lip 2a is integrated into the outer panel 20 so as to form a single disassemblable piece, the inner panel 21 being attached upstream from a case of the fan belonging to the middle section of the nacelle via fastening flanges 3, integral with the downstream structure 2b and the case, respectively.

The air intake structure 2 can be modular and comprise a plurality of outer panels 20 each defining a corresponding air intake lip portion 2a.

The inner panel 21 is made from an acoustic shroud and is connected via flanges 3 to the case of the median section. This inner panel 21 therefore constitutes a fixed part of the air intake structure 2 on which the outer panel 20, integrating the air intake lip 2a, is designed to be removably attached and fixed.

It will be noted that alternatively, the outer panel 20 can also comprise all or part of an outer panel of the middle structure.

To do this, each flange 3 also supports a radial peripheral partition 5.

This partition 5 can support center finders and secondary center finders extending perpendicularly to said partition 5 toward the upstream of the nacelle.

It will also be noted that the air intake structure 2 can extend axially via its outer panel 20 beyond a valve guide plate of an inner plate 21 to the fixed structure of the nacelle 1 to be close to an outer structure of a thrust reverser structure belonging to the downstream section of the nacelle and possibly to cover the cowls. A system of bolts can then be provided to maintain the air intake structure on the partition 5 integral with the structure of the case or a structure upstream from the downstream structure.

It will also be noted that the radial peripheral partition 5 can be supported directly by the very structure of the fan case in order to provide a maximum inner envelope for the air intake 2.

The outer panel 20 integrating the air intake lip 2a therefore forms, according to the prior art, a removable portion designed to be attached on the fixed portion and more particularly on the peripheral partition 5.

Inner reinforcements of the existing inner and outer panels are not shown and depend on the stiffness desired by the person skilled in the art.

More particularly, the removable structure can be mounted, for example, on a rail 6/guideway 7 sliding system comprising a plurality of rails 6/guideways 7 distributed on the periphery of the air intake structure 2.

According to the invention, the removable structure is maintained using locking means comprising at least one electric bolt 10 of the hook type each capable of cooperating with a complementary retaining means 11 of the yoke type.

In the case in point the complementary retaining means 11 are attached to the fixed structure while the electric locks 10 are attached to the removable structure.

The locking means can each be equipped with at least one stiffener supporting the bolt. In the case in point, the stiffeners are associated with guideways 7, but this is not strictly necessary.

FIGS. 1 and 2 show the removable structure in the closed and open positions, respectively.

The locking and unlocking controls of the electric locking means are grouped together at the level of an outer control means of the nacelle and/or at the cockpit of the airplane.

The retaining means 11, of the yoke type, are positioned on the fixed structure of the nacelle in a zone guaranteeing the best structural rigidity in order to avoid any deflection of that interface.

Advantageously, one may use electric bolts of known type in which at the end of the closing maneuver, a three-point system is exceeded by the system of rods driving the hook in order to guarantee optimal resistance under all of the loads seen by that equipment during flight cycle.

Each bolt advantageously has a screw 12 for driving the hook exceeding the bolt 10 toward the outside of the nacelle.

For each bolt a corresponding hatch 13 can be formed in the outer panel 20 allowing access to one end of the screw 12.

By opening the hatch 13, it is thus possible to connect, on the end of the screw 12, a tool 9 capable of allowing manual driving of the latter.

The tool may advantageously be guided by a fitting 14 fixed on the inside of the outer panel 20 at the level of the hatch 13.

If the rotor of the motor must be blocked to allow the movement of the driving screw 12 through the body of the motor, several solutions known by those skilled in the art can be applied such as the proposed example in which a second hole 22 is formed in the fitting 14 to allow the placement of an axle 24 for blocking the motor.

Figure 3:
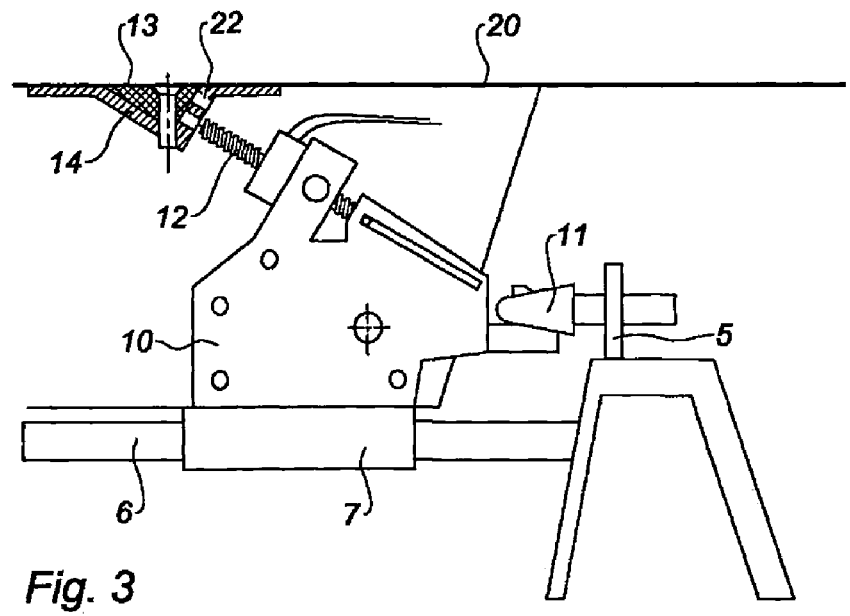
FIG. 3 is an enlarged partial diagrammatic illustration of a first embodiment of a locking means equipping the nacelle of FIGS. 1 and 2.
Figure 4:
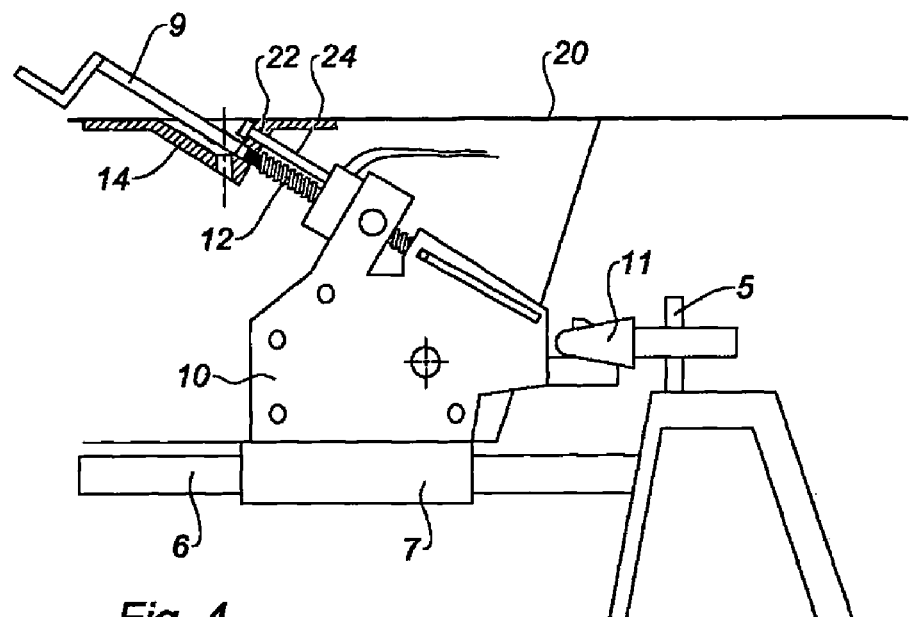
FIG. 4 is an enlarged partial diagrammatic illustration of a second embodiment of a locking means equipping the nacelle of FIGS. 1 and 2.

This embodiment is illustrated in FIGS. 3 and 4.

In normal conditions, a plug is placed inside the hatch 13 in the fitting 14 so as to restore the outer aerodynamic line.

Figure 5:
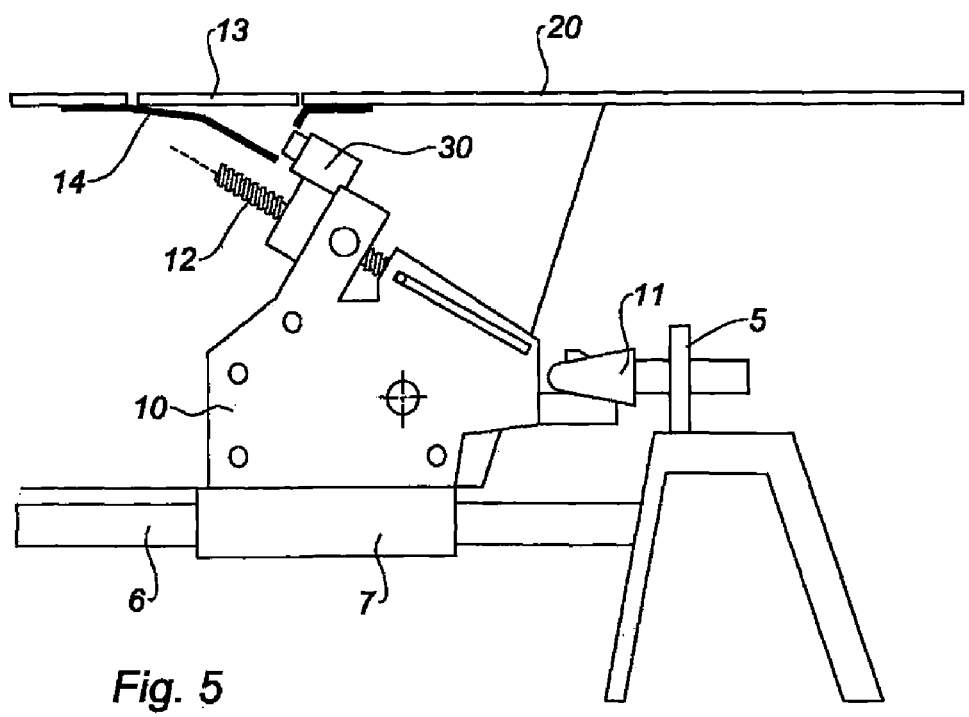
FIG. 5 is an enlarged partial diagrammatic illustration of a third embodiment of a locking means equipping the nacelle of FIGS. 1 and 2.

The manual driving can also be done via a dedicated component of the MDU (Manual Drive Unit) type 30 connected to the drive motor of the electric bolt 10. This embodiment is illustrated in FIG. 5.

Figure 6:
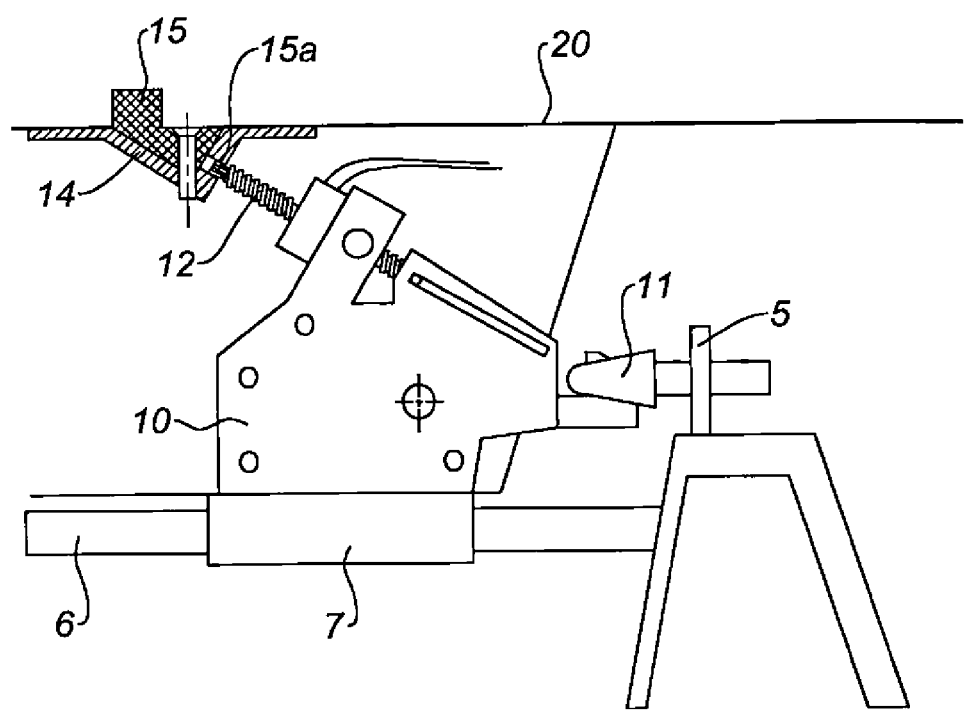
FIG. 6 is an enlarged partial diagrammatic illustration of a locking means equipping the nacelle of FIGS. 1 and 2, said locking means being mechanically inhibited.

One may also introduce, into the hatch 13, a particular plug 15 having an appendage 15a capable of cooperating with the screw 12 so as to block it. Such a plug will then make it possible to mechanically inhibit the electric bolt. This configuration is illustrated in FIG. 6. The plug 15 may have an aerodynamic appendage visible from the outside of the nacelle in order to recall its presence.

At least one part of the locking means 10 are each associated with a means for signaling their locking or unlocking state and the information of which can be escalated to the cockpit or a control center, for example.

This signaling means can assume the form of a proximity detector situated on the yoke 11 opposite an end of the hook 10 so as to obtain an "all or nothing" type signal and ensure that the hook is sound and actually in place to perform its role.

The signaling means is preferably placed on a fixed element (yoke, for example) in order to reduce the disconnection interfaces, which would reduce the reliability of the system.

The locking means equipping a nacelle according to the invention also present prestress adjustment means.

Currently, the adjustment of the prestress in the mechanical locking systems is generally done by positioning a spring balance at the end of the handle, hook in contact on the yoke, then by pulling on the spring balance and verifying the traction value obtained.

When this value is not appropriate, it is then necessary to access the fixing system of the yoke and to adjust its axial position, then again perform the check until the desired value is obtained.

In the framework of an electric locking as used here, the prestress value can be checked in different ways, such as by the stress given to the motor during the locking, through a manual driving system using a dynamometric key, by a stress sensor installed on one of the mechanical parts in contact and stressed like the hook or the yoke, or by a torque limiter installed on one of the mechanical parts in contact and stressed like the hook or the yoke.

These various means are used to check and monitor the stress.

The present locking means are also equipped with adjustment means making it possible to adjust the pre-stress value when the removable structure is in the closed position.

Figure 7:
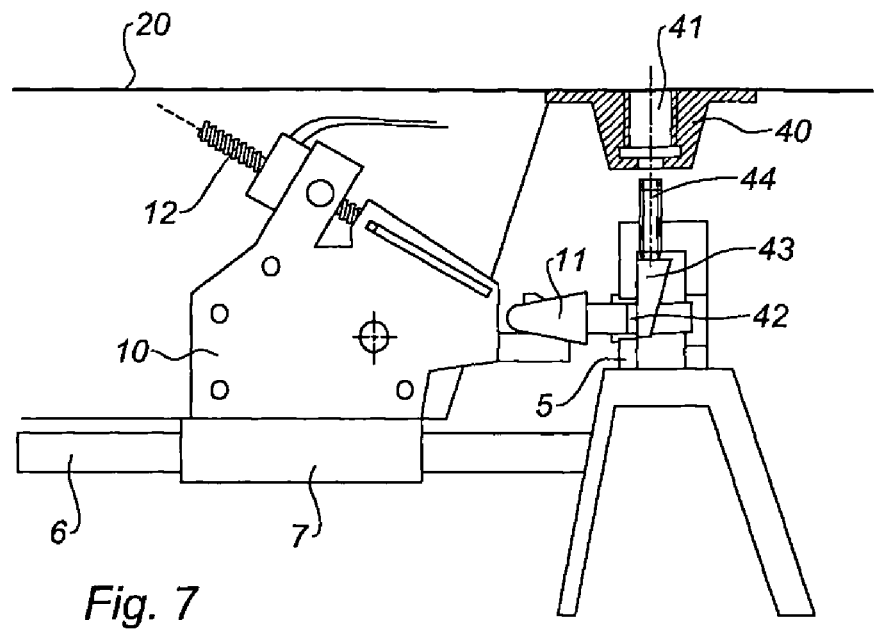
FIG. 7 shows a first embodiment of the prestressing of a locking means equipping a nacelle according to the invention.

FIG. 7 presents a first means for adjusting the prestress.

In the case in point, a fitting 40 is situated on the removable outer structure opposite the element to be adjusted (yoke 11 here) when said removable structure is in the closed position. An opening 41 is formed in the fitting so as to allow the passage of an adjustment tool such as a key.

Of course, for reasons of aerodynamic continuity, the opening will be made as small as possible. An aerodynamic plug may close the opening during exploitation.

The yoke 11 is mounted mobile in translation along the direction of locking, a lumen 42 is present capable of receiving a lug 43 having a first end of small thickness and a second end of greater thickness.

By moving the lug 43 using an adjusting screw 44 capable of being maneuvered owing to a tool introduced through the fitting 41, it is possible to adjust the axial position of the yoke 11 and as a result, the stress in the hook 10 during locking. The precision of the adjustment will of course depend on the slope given to the lug 43.

Of course, the access fitting 40 may be replaced by a hatch, for example, or any other means allowing access to the adjustment screw.

Figure 8:
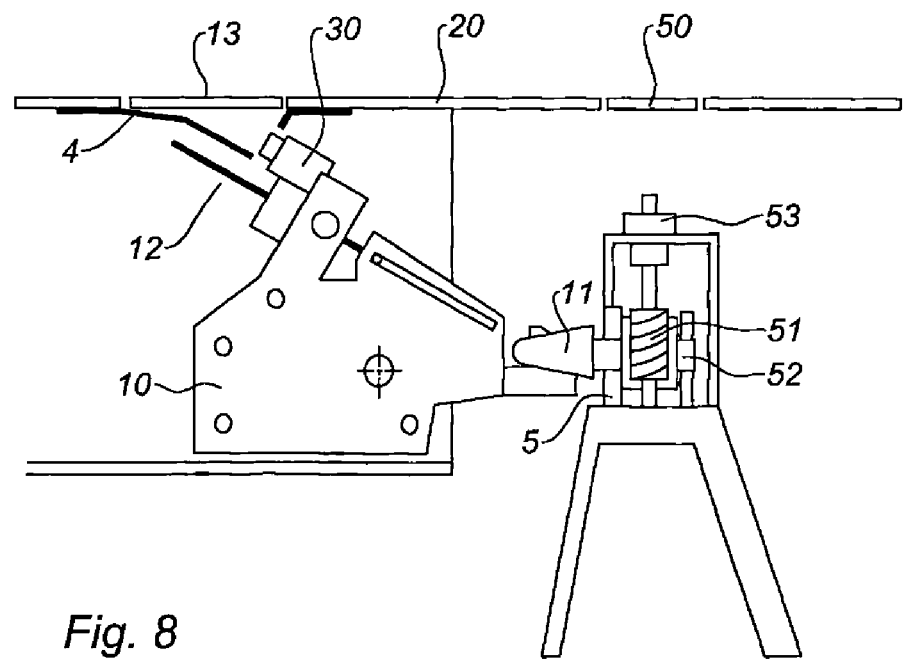
FIG. 8 shows a second embodiment of the prestressing of a locking means equipping a nacelle according to the invention.

FIG. 8 presents a second means for adjusting the pre-stress.

In the case in point, an access hatch 50 is formed in the outer wall 20 of the removable structure opposite the element to be adjusted (yoke 11 here) when said removable structure is in the closed position. Access by fitting as previously described is of course possible.

The means for adjusting the pre-stress comprises a worm screw 51 cooperating with a threaded end 52 of the yoke, so as to thus allow an axial movement of the latter part when the worm screw 51 is made to rotate.

A locking device 53 of the worm screw is added so as to ensure resistance of the adjustment over time.

In order to reduce parasitic stresses and make the reading of the torque value more reliable on the dynamometric key, a specific stop for reducing friction can be inserted between the fixed support and the adjustment nut.

A torque limiter can also be added at the inlet of the worm screw, thereby ensuring control of the stress in the yoke without needing to use a dynamometric key. Moreover, this system can be motorized in order to ensure identical continuous stress by continuous stress check.

The locking can also be associated with a proximity detection of the removable upstream structure close to its closing position, said proximity detecting being able either to authorize the implementation of the locking. This makes it possible to guarantee a good distance for the gripping of the yoke by the hook. The proximity detection may potentially also be used to trigger an automatic locking as a function of that approach of the removable structure.

Although the invention has been described with one particular example of embodiment, it is of course in no way limited thereto and includes all technical equivalents of the means described as well as their combinations if they fall within the scope of the invention.

The invention claimed is:

1. A nacelle for a turbojet engine, comprising:
an air intake structure configured to direct an air flow towards a fan of the turbojet engine; and
a middle structure configured to surround said fan and to which is attached the air intake structure in order to provide an aerodynamic continuity,
wherein the air intake structure includes at least one inner panel attached to the middle structure and defines, with the latter, a nacelle fixed structure, the air intake structure further including at least one outer longitudinal panel that includes an air intake lip in order to define a removable air intake structure that is axially movable along a rail-guideway sliding system, and
wherein the removable air intake structure is provided with peripheral locking means including at least one electric lock that interacts with a complementary retaining means,
wherein at least one of the peripheral locking means and the complementary retaining means is attached to the nacelle fixed structure, and the rail-guideway sliding system is also attached to the nacelle fixed structure, and
wherein a fitting situated on the at least one outer longitudinal panel forms an opening that is configured to provide for insertion of a tool from outside of the outer longitudinal panel such that while inserted in the opening, the tool engages with adjusting means for adjustment of a prestress of the complementary retaining means.

2. The nacelle according to claim 1, wherein the at least one electric lock comprises a hook configured to cooperate with a corresponding yoke.

3. The nacelle according to claim 1, wherein the at least one electric lock is situated at a level of a guide rail.

4. The nacelle according to claim 1, wherein the at least one electric lock is associated with at least one means for detecting the locking and/or unlocking position.

5. The nacelle according to claim 1, further comprising a member for controlling the locking means.

6. The nacelle according to claim 1, wherein each electric locking means is configured to be locked or unlocked manually from outside of the nacelle via a hatch formed in the at least one outer longitudinal panel of the air intake structure.

7. The nacelle according to claim 1, wherein the electric locking means are configured to receive a mechanical inhibiting rivet designed to allow blocking of the corresponding electric locking means.

8. The nacelle according to claim 1, wherein the adjusting means comprise an adjustment screw configured to move a lug having an inclined surface so as to allow the adjustment of the prestress of the complementary retaining means along a retaining direction.

9. The nacelle according to claim 1, wherein the adjusting means comprise a worm screw configured to cooperate with a threaded zone of said complementary retaining means so as to allow a translation of the complementary retaining means along a retaining direction.

10. The nacelle according to claim 1, wherein the complementary retaining means are attached to the fixed structure while the at least one electric lock is attached to the removable air intake structure.

* * * * *